April 20, 1971  J. H. DOLL  3,575,730
VALVING FOR DEFERRED ACTION ELECTROCHEMICAL GENERATORS
Filed Dec. 11, 1968  2 Sheets-Sheet 1

INVENTOR
JEAN HENRI DOLL
BY
ATTORNEYS

INVENTOR
JEAN HENRI DOLL
BY
ATTORNEYS

United States Patent Office 3,575,730
Patented Apr. 20, 1971

3,575,730
VALVING FOR DEFERRED ACTION ELECTRO-CHEMICAL GENERATORS
Jean Henri Doll, Aulnay-sous-Bois, France, assignor to Societe des Accumulateurs Fixes et de Traction (Societe Anonyme), Romainville, France
Filed Dec. 11, 1968, Ser. No. 792,190
Claims priority, application France, Dec. 13, 1967, 131,995; Sept. 6, 1968, 165,361
Int. Cl. H01m 1/06, 1/08
U.S. Cl. 136—177
14 Claims

ABSTRACT OF THE DISCLOSURE

Valving for deferred action generators to control and limit flow into the latter of activating electrolyte of such generators permitting venting otherwise entrapped air within the generators during fill flow of the electrolyte, the valving including a jellifying and expanding material that is normally porous but which is affected by the electrolyte upon contact therewith at completion of fill to jellify and expand and to become impervious and thus to shut off further venting of air from the electrolyte filled generator and also thereby to prevent egress from the generator of any electrolyte, thus insuring uniformity of electrolyte activating fill to such a plurality of generators supplied from a common source of electrolyte. The jellifying material when the electrolyte is, for example, potash (KOH) is, for example, flour especially corn flour, starch flour or like compounds or powdered salts such as magnesium or aluminum salts or oxides, the magnesium or aluminum salts being resistant to environmental moisture exhibit a double effect; they are subject to jellification and expansion when contacted by the electrolyte and afterwards they can be at least partially dissolved in it.

BRIEF SUMMARY OF INVENTION

The present invention relates to electrochemical generators of the deferred-action type. Such generators having an assembly of positive and negative charged electrodes stacked in dry condition with intervening separators, are characterized by the fact that their activation results from the injection of an appropriate electrolyte stored separately in a reservoir prior to the time of actuation. This type of generator works satisfactorily only if activation has been correctly effected, i.e. only if an adequate amount of electrolyte has been distributed as rapidly as possible throughout the electrode-separator stack.

Correct activation of a single generator depends on the homogeneity of the electrode-separator stack so the problem becomes more complicated when a plurality of generators must be actuated simultaneously from a single electrolyte reservoir, this last arrangement having the considerable advantage of requiring only small sized and simplified activation device.

In fact, since generator stacks of a plurality of generators differ more or less from each other their activation from a common source does not always progress in the same way and particularly at the same speed in all cases.

A fast, complete and substantially instantaneous filling of all stacks of the plurality of generators is necessary for most applications of deferred-action batteries since every generator of the assembly must be able to become operative within the very short period permitted for activation.

To ensure a fast and simultaneous filling of a plurality of generators, a difference of pressure between their cases and the electrolyte reservoir can be used, for example, by a gas exerting a pressure between a flexible reservoir and its rigid container. But in this case, some air is trapped in the case and the stack and it, too, should be expelled because, if it becomes compressed by electrolyte, it would prevent this electrolyte from impregnating all the electrode separator stack so that activation of such stack would only be partial.

An object and feature of the invention is to overcome the above-mentioned drawbacks by means of a chemical valve through which as a first step, the trapped gas which is inside the generator can be expelled by degrees as activation by electrolyte proceeds and which, as a second step, stops any possible leakage of liquid electrolyte outside the generator once its stack has become filled with electrolyte.

A chemical valve according to the invention is particularly remarkable in that it comprises a small chamber wherein a material is placed, advantageously in a compressed state, which is porous in its dry state and which is able to react rapidly with the electrolyte so that it ceases to be porous and acts as a seal. This chamber has at least two apertures, one of which opens inwards and the other opens outwards, both apertures being separated by the said material. In the dry state, while it is porous venting therethrough of gas is possible, on being wet by the electrolyte, the material becoming non-porous it shuts off gas venting or outward flow of electrolyte.

According to another feature of the present invention the pressure drop inside the chamber containing the said material can be varied by compressing the latter more or less.

It has been observed that a pressure drop of a few hundreds g./cm.$^2$ is suitable for most applications.

According to another feature of the invention, when the electrochemical generator of the deferred-action type emits gases while discharging the material contained in the valve can be chosen so that it becomes again pervious to such gases.

This invention is based on the use of a material which jellifies and bulges when the electrolyte comes in contact therewith.

When several generators enclosed in individual cases must be actuated simultaneously from the same electrolyte reservoir, it has been found that each generator should preferably be fitted with an individual valve of this invention, such arrangement showing the new and unexpected advantage of a self regulated actuation, as will be described below.

According to the invention, the valve fitted on each generator cell closes when the particular generator has received the amount of electrolyte required for its correct activation, so that therein neither loss of electrolyte nor of its pressure occurs. The total pressure driving the electrolyte from the common filling source is, therefore, exclusively exerted on the generators that have not yet been fully filled up, and forces the electrolyte from said source to flow into the generators that have not yet been completely activated until all of them are filled one after the other to desired uniformity.

It can be seen that the invention permits a self-regulated actuating of the cells and in the meantime limits the amount of required electrolyte at the source to the minimum required for uniform activation of all. In fact, since no electrolyte can flow out through the valve of each cell according to the invention, only the required amount can be introduced into each cell. Therefore, to ensure the correct filling of all cells, no excess of electrolyte has to be provided at the source as was the case with previous arrangements.

Furthermore, since it is no longer necessary to store electrolyte at the source in excess, this invention permits avoidance of the tubing and the exhaust chamber which otherwise must be provided for the electrolyte in excess passing through the cells, and thus eliminates a cause of leakage current and results in a simplified actuating device compared to previous devices.

It should be noted that all individual generators can easily be equipped with a valve according to the invention owing to the light weight, small size and low cost of these valves.

The valves according to the invention can be made as a part of the case, such as the lid or a wall, or otherwise inserted in the lid, for example, by screwing.

For generators having a central feed channel, such as described in the U.S. Pat. No. 2,847,494, the valve is preferably located on the peripheral wall of the case containing the generator. Alternatively, particularly when actuating is effected through the bottom of the case, the valve can be advantageously fitted on the lid of the case.

The valves of this invention can be constituted by a tubing wherein the above-mentioned jellifying and bulging material is advantageously compressed between two perforated or porous parts, the said tubing being threaded and screwed on the case. The principal parts of the valves may be advantageously made of molded plastic material, but any other material, insulative or not, can be used.

In another embodiment, the jellifying and bulging material contained in the chamber can be divided in several compartments alternated with hollow or porous areas, that are preferably hydrophobic.

It must be noted that a certain pressure is necessary to expel entrapped gas through the valve because of the above-mentioned compression of said material. As a consequence no gas can enter the cell from the environment, so that shelf storage time is not reduced. Nevertheless, if such an effect according to the invention appears to be insufficient for certain applications, in case of substantial variations of environmental pressure, for example, sealing devices may be fitted to the requisite apertures. This arrangement ensures the additional advantage to permit storage in moist environments since the jellifying and bulging material is protected thereby.

If needed, certain jellifying and bulging materials can be used, having the property of forming at first with the electrolyte a bulging jelly which ultimately dissolves again at least partially, in the presence of the electrolyte. This is advantageous because, after having fulfilled its function during cell actuation, the valve can again let gases escape as pressure builds-up in the cell case. Such a valve is very useful for generators emitting gases during operation.

In consequence, the valve works in three consecutive ways: firstly, gases are expelled outwardly when the electrolyte fills the erspective cells, secondly, electrolyte will not escape from the cells after their activation is complete and afterwards gases developing during cell operation can escape.

Other objects and features of this invention will become more fully apparent from the following detailed description of several embodiments illustrated in the accompanying drawings given only as examples, wherein.

Figure 4:
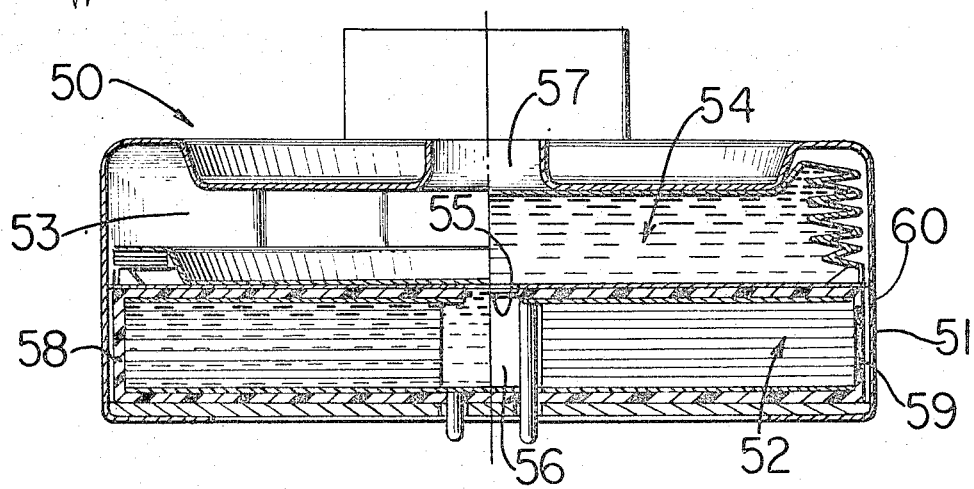
Figure 5:
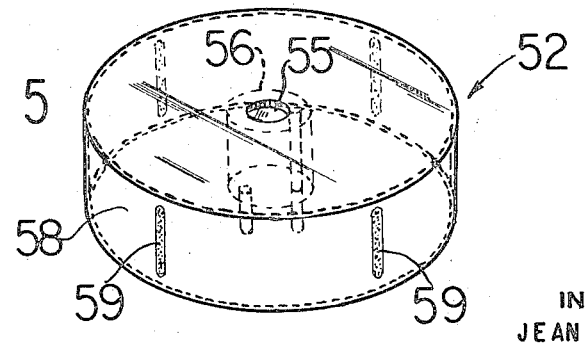

FIG. 4 is a sectional view of a generator with a central feed channel designed according to an embodiment of the invention, wherein the electrolyte chamber of variable volume is seen at the right side before actuating and at the left side after actuating of the electrode-separator stack; and FIG. 5 is a perspective view of the electrode-separator stack used in the generator seen in FIG. 4 and coated with an outer layer of lacquer or insulating resin, in which valves embodying the invention have been arranged.

DETAILED DESCRIPTION

Figure 1:
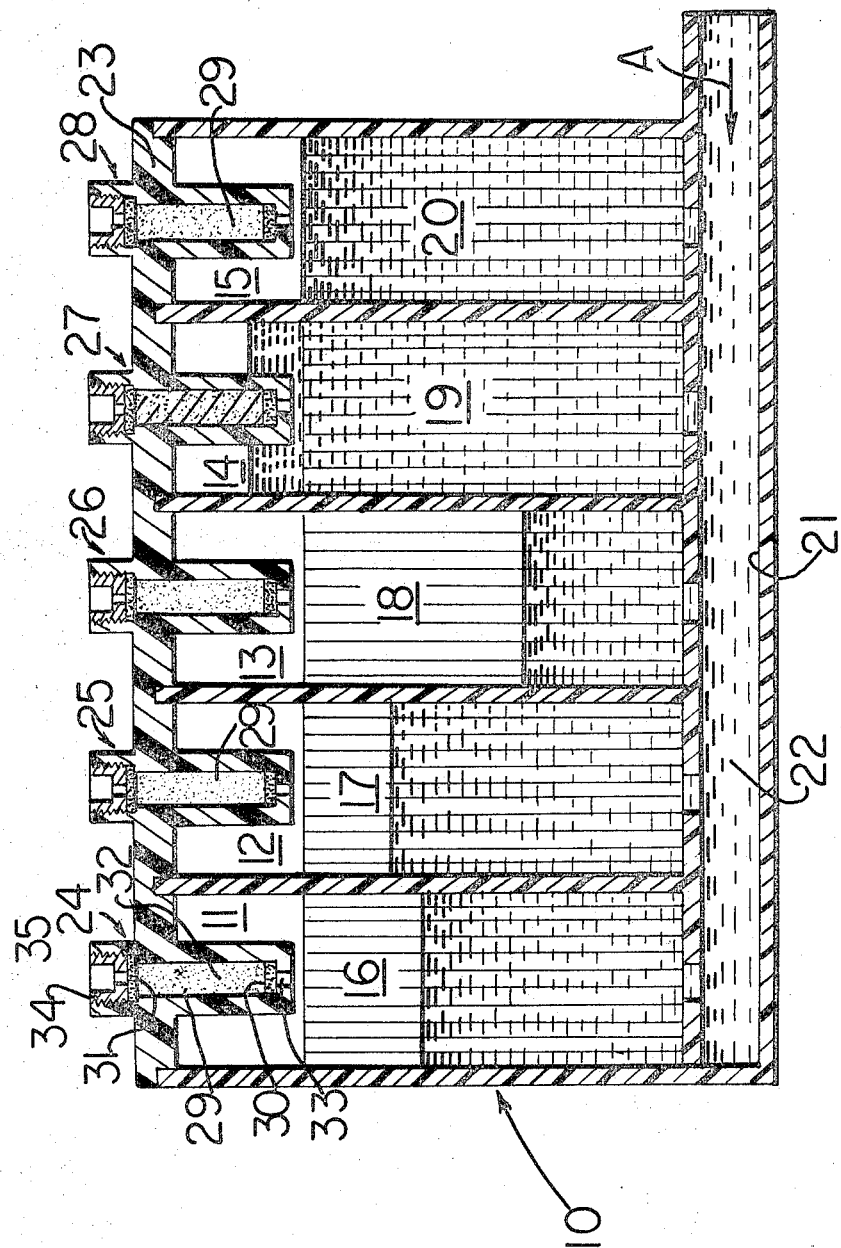
FIG. 1 is a vertical section of a deferred-action battery comprising several individual generator cells, in separate compartments, a common feed channel being provided for all the individual compartments and a chemical valve according to the invention being provided for each compartment.

According to the embodiment illustrated in FIG. 1, a battery of electro-chemical generators of deferred-action type 10, comprising five individual compartments 11 to 15 respectively containing electrode-separator stacks 16 to 20, each of which is to be actuated via a common feed channel 21 with the electrolyte shown in area 22. Granting that the electrolyte 22 spreads at different speeds into the compartments, the illustrated example shows completely activated generators 14 and 15 whereas the generators 11, 12 and 13 are only partially activated, the compartment 13 being filled the last of all.

The respective compartments 11 to 15 are closed by a specially designed cover 23. Each compartment 15 is fitted with an individual chemical valve 24 to 28 lodged in the cover 23 over the respective compartment. These valves 24 and 28 are of like structure and only valve 24 is described. The valve 24 is constructed as follows:

It comprises a jellifying material 29 maintained in a chamber 32 of the cover 23 over compartment 11 between two porous caps 30, 31. A small channel 33 connects the compartment 11 to the aperture 32 whereas the cap 31 is held in place as by a plug 34 perforated at 35.

As long as the compartment 11 is not completely filled with the electrolyte 22 which cannot pass between the walls of the compartment and the electrode stack 16, for example, as a result of a tight fit of the latter against the said walls, the air contained in the compartment is expelled outwards thereof by the rise of the electrolyte therein and escapes via apertures 33, 35 after passing through the porous caps 30, 31 and the porous material 29 contained in the chamber 32.

However, when electrolyte reaches the valve 24 and enters it, as is occurring for the compartment 14, the porous material 29 is impregnated by the electrolyte, jellifies and becomes impervious to preventing electrolyte from overspilling via vent 35. The remaining trapped air in the compartment 11 then exerts a counter pressure which stops the rise of the electrolyte in compartment 11. This same action occurs in each compartment 11–15 as controlled by its like chemical valve 24–28.

The material 29 used in each chemical valve must jellify and bulge on contact by electrolyte which is usually a concentrated aqueous solution of potash (KOH), in order to close air exits 35 that are provided to promote a fast activation. In addition, if the aperture 35 is always kept open, the material 29 should preferably be resistant to environmental moisture.

Advantageously, the jellifying material in chamber 32 of each valve 24–28 is compressed to a determined value initially so that all individual gas flows from respective compartments are rendered substantially equal and also so that no reverse flow admission of environmental air into any compartment is practically possible.

When electrolyte is potash solution (KOH), the jellifying material 29 can be flour especially corn flour, starch and like compounds, or powdered salts and more particularly magnesium or aluminum salts or oxides. Particularly, aluminum salts or oxides exhibit the above-described double effect because they dissolve again in the potash solution and permit escape of gases developed during operation of the activated generator.

In addition to the fact that the right amount of electrolyte 22 just required for actuating all of the individual generators of the battery is used, the valves according to the invention can maintain in the battery compartments a certain residual pressure after their full actuation so that the penetration of the electrolyte into the separators is improved. During activating of the battery the electrolyte 22 is forced to the compartments by suitable pressure as denoted by the arrow A.

Figure 2:
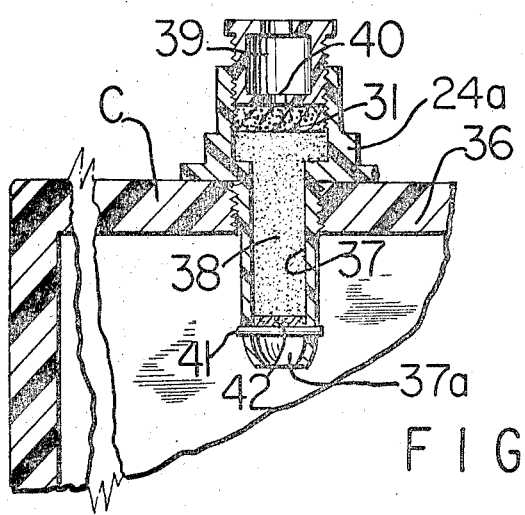
FIG. 2 is a sectional view of an individual valve to be screwed in the wall of a compartment.

According to the further embodiment shown in FIG. 2, a chemical valve 24a, operating similarly to the valve 24, is constituted as a separate item mounted, for example, screwed, on the cover of a generator case C.

The valve 24a is constituted by a hollow cylindrical body 37 wherein is enclosed a jellifying material 38 which is compressed inside the body 37 between a plug 39 provided with an aperture 40 and at least one pin 41 holding a porous disk 42 adjacent inner opening 37a of body 37. This jellifying material is similar to material 29.

Figure 3:
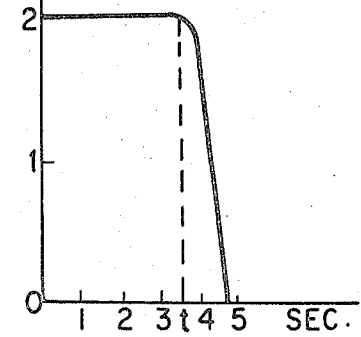
FIG. 3 is a graph which shows the response time of a valve according to the invention.

FIG. 3 shows the response time of a valve according to the invention, i.e. the time required for closing. The valve used in plotting the curve of FIG. 3 had an inner diameter of 4 mm. and the powder material was compressed to a height of 12 mm. The flow of dry air passing through the valve is given as ordinates in liters per minute and the elapsed time as abscissae in seconds. Potash electrolyte reaches the valve at the moment $t$ and the electrolyte impregnated valve closses at the moment $(t+1)$ seconds, i.e. about one second later.

According to another embodiment illustrated in FIGS. 4 and 5, an electrochemical generator 50 with a central feed channel comprises a compartment 51 housing the electrode-separator stack 52 and a compartment 53 in which is located an electrolyte containing chamber 54 which has variable volume.

Prior to actuating of the stack 52, the chamber of variable volume 54 is in exapanded shape as seen at the right side of FIG. 4. It is filled with electrolyte and separated from compartment 51 as by a rupturable diaphragm 55. Before actuating, the diaphragm 55 closes the inlet of a central feed channel 56 leading to the stack 52.

Actuating is triggered, for example, by exerting a pressure in the space 57 above the chamber 54 which is shaped as a bellows. The effect of the pressure ruptures diaphragm 55 and flattens the chamber 54, as seen at the left side of FIG. 4, thus driving the electrolyte in chamber 54 into the electrode stack through the central feed channel 56.

The sides of the electrode-separator stack are coated with a layer 58 of an insulating resin or lacquer which is preferably impervious.

This coating 58 is provided with slots or windows 59 respectively packed with suitable jellifying material, e.g. compressed corn flour starch. The so-sealed slots constitute chemical valves permitting air to escape from the stack 52 as long as the starch material is still dry and then to escape between the said coating 58 and the case up to the apertures 60 provided in the casing 51 for exit. On the other hand, after triggering, when electrolyte reaches the starch, the bulging of the latter stops all possible leakage of liquid via slots 59 either between the coating 58 and the casing 51, or a fortiori outwards via apertures 60.

Many modifications may be effected in the described embodiments. More particularly, the jellifying material may be retained by any appropriate means, for example, an inert porous matrix or carrier. This support, for example, composed of felt, may be shaped as a sheet of suitable thickness, cut into specified sizes and located either in front of the air exits such as 59 for a battery with a central feed channel (FIG. 5) or in cylindrical spaces such as 32 (FIG. 1) or again in individual hollow cylindrical bodies such as 37 (FIG. 2).

To summarize, the use of a chemical valve according to the invention which is easy to make with negligible volume and weight comparatively to known devices, offers many advantages among which should be more particularly mentioned:

Air is vented during a predetermined time; electrolyte pressure is maintained at an optimum value during actuating; built-up pressure of gases are eventually vented after a certain period of generator operation; electrolyte used does not exceed the volume exactly required for complete filling of the electrochemical generator and correlatively no electrolyte bridges for leaking current can be formed in the actuating device; no electrolyte is expelled out of the cell compartments or cases and correlatively no electrolyte bridges for leakage current, are found in the air venting system; and electrolyte can be rapidly injected at a speed fixed by a proper selection of the jellifying material and the rate of its compression.

While specific embodiments of the invention have been described and shown, variations in practice within the scope of the appended claims are possible and are contemplated. There is no intention, therefore, of limitation to the exact abstract or disclosure herein presented.

What is claimed is:

1. An electrochemical generator of the deferred action type comprising a compartment containing an electrode separator pack whose actuation requires introduction into the pack in the compartment at a point to cause flow through the pack for activation of separately maintained electrolyte, a chemically operated valve remote from said point to permit venting of air from the compartment during flow through the pack therein of said electrolyte for activating of said pack with a requisite quantity of said electrolyte, said valve comprising a chamber with a vent opening in communication with the environment and having a second opening in direct communication with said compartment and remote from said point and powdered dry porous material in said chamber between said openings through which entrapped gas within the compartment may escape during activation flow of said separately maintained electrolyte into said pack in said compartment and until said electrolyte reaches said second opening and enters said material in said chamber through said second opening, said material on such entry then becoming impervious by jellifying and bulging upon the contact therewith in said chamber of the electrolyte entering into it via said second opening to then cut off further venting of entrapped air from said compartment and also prevent escape of electrolyte from the compartment via said openings through the now impervious material in said chamber, the said electrolyte in said pack then being present and retained therein in said requisite quantity.

2. An electrochemical generator as per claim 1, wherein said powdered porous material in said chamber is in a compressed porous state whose extent of compression limits the rate of flow of air therethrough.

3. An electrochemical generator as per claim 2 wherein the extent of compression provides a pressure drop of a few hundreds of $g./cm.^2$ in the porous material during activation of the generator.

4. An electrochemical generator as per claim 1, wherein said valve is positioned in a wall of the generator compartment, said second opening communicating with said compartment and located so that transit of electrolyte through the pack must occur before the electrolyte arrives at the second opening.

5. An electrochemical generator as per claim 1, wherein said jellifying and bulging material is selected from the group consisting of corn flour, starch flour, powdered magnesium salt, powdered magnesium oxide, powdered aluminum salt and powdered aluminum oxide.

6. An electrochemical generator according to claim 1, said valve comprising porous means in said chamber adjacent each of said openings, said material being confined between said porous means.

7. An electrochemical generator according to claim 1, said valve comprising separate porous caps in said chamber adjacent the respective openings and between which porous caps said material is confined.

8. An electrochemical generator as per claim 1, said valve comprising a separate body secured in a wall of said compartment and having said chamber and in which said chamber the said powdered dry porous material is positioned.

9. An electrochemical generator as per claim 1, comprising a central feed channel for the electrolyte, said electrode separator pack being laterally coated with an impervious layer having at least one slot defining said chamber in which said material is disposed.

10. An electrochemical generator as per claim 1 comprising, a plurality of said compartments each containing a said electrode separator pack, said compartments being arranged for activating filling with the separately maintained electrolyte from a common feed channel and at least one separate like said chemically operated valve for each such compartment.

11. A chemically operated valve for permitting venting of a deferred action electrochemical generator including an electrode separator pack in an enclosed compartment during activating filling of the pack with electrolyte and for cutting off gas venting and outflow of electrolyte from the compartment upon completion of activating filling of said compartment with a required quantity of said electrolyte comprising a member having a chamber with an aperture open to environment and an aperture opening into said compartment, and porous dry powdered jellifying and bulging material within said chamber that in dry state permits transit of gas therethrough but which jellifies and bulges upon wetting contact therewith of electrolyte entering it via said second named aperture after transit through the pack to become impervious to further transit through said material of venting gas and also escape of electrolyte via the apertures.

12. A chemically operated valve as per claim 11, wherein said material is porous, dry and in a partially compressed state to limit rate of flow therethrough of venting gas.

13. A chemically operated valve as per claim 12, wherein said material is selected from the group consisting of corn flour, starch flour, powdered magnesium salts, powdered magnesium oxide, powdered aluminum salt and powdered aluminum oxide all subject to jellification and bulging upon being wetted by an alkaline electrolyte.

14. A chemically operated valve as per claim 13, wherein the alkaline electrolyte is concentrated potash.

References Cited

UNITED STATES PATENTS

| | | | |
|---|---|---|---|
| 2,298,938 | 10/1942 | Griffin, Jr. et al. | 220—44 |
| 2,465,202 | 3/1949 | Craig | 136—179 |
| 3,100,165 | 8/1963 | Chapman | 136—177 |
| 3,282,740 | 11/1966 | Wylie | 136—170 |

FOREIGN PATENTS

| | | | |
|---|---|---|---|
| 799,217 | 8/1958 | Great Britain | 136—177 |

WINSTON A. DOUGLAS, Primary Examiner

A. SKAPARS, Assistant Examiner

U.S. Cl. X.R.

136—178; 220—44